(12) United States Patent
Short

(10) Patent No.: US 8,100,403 B2
(45) Date of Patent: Jan. 24, 2012

(54) HYDRODYNAMIC INTERSHAFT SEAL AND ASSEMBLY

(75) Inventor: John F. Short, Smithfield, RI (US)

(73) Assignee: Eaton Corporation, Cleveland, OH (US)

( * ) Notice: Subject to any disclaimer, the term of this patent is extended or adjusted under 35 U.S.C. 154(b) by 594 days.

(21) Appl. No.: 12/347,137

(22) Filed: Dec. 31, 2008

(65) Prior Publication Data

US 2010/0164180 A1 Jul. 1, 2010

(51) Int. Cl.
*F16J 15/00* (2006.01)
(52) U.S. Cl. ......... 277/345; 277/390; 277/500; 277/543
(58) Field of Classification Search .................. 277/345, 277/350, 390, 500, 543
See application file for complete search history.

(56) References Cited

U.S. PATENT DOCUMENTS 5,169,159 A 12/1992 Pope et al.

FOREIGN PATENT DOCUMENTS

| EP | 0995933 A2 | 4/2000 |
|---|---|---|
| EP | 1302709 A2 | 4/2003 |
| WO | WO2004053365 A1 | 6/2004 |

OTHER PUBLICATIONS

European Patent Office, International Search Report and Written Opinion issued in counterpart PCT application No. PCT/IB2009/007891. Date of Mailing May 11, 2010.

*Primary Examiner* — Vishal Patel
(74) *Attorney, Agent, or Firm* — Dykema Gossett PLLC

(57) ABSTRACT

A seal and seal assembly for providing a seal between an outer shaft and an inner shaft. The assembly includes a seal subassembly disposed between the shafts. The subassembly includes a split carbon ring, a solid outer ring, and a spring mechanism provided between the split carbon ring and the solid outer ring. The carbon ring is radially split into a plurality of segments having splits between ends of adjacent segments. The segments include a circumferential inner radius and a sealing dam on the circumferential inner radius. The solid outer ring includes a sealing face and a plurality of hydrodynamic grooves provided on a radial face. The spring mechanism may be configured to engage a portion of an outer diameter of the split carbon ring and a portion of an inner diameter of the solid outer ring and to urge the split carbon ring radially towards the inner shaft.

24 Claims, 9 Drawing Sheets

HYDRODYNAMIC INTERSHAFT SEAL AND ASSEMBLY

TECHNICAL FIELD

The present invention generally relates to intershaft seals, such as those used in connection with gas turbine engines.

BACKGROUND

Intershaft seal concepts of various forms are found in industry. For example, intershaft seals have been employed with counter rotating gas turbine engines to seal the space provided between two coaxial rotating shafts. Conventional concepts commonly employ a piston ring type seal—such as a cracked carbon ring—and deposit it between the two shafts. When used, a carbon ring is slightly pressed into the outer shaft bore and its side face is pushed axially by pressure to contact a shoulder portion on the inner shaft to form a main seal. Under operating speed conditions, the centrifugal load from rotation will force the carbon ring against the outer shaft bore. Relative axial movement between the two shafts is accompanied by sliding of the carbon seal ring against the outer shaft.

SUMMARY

A seal and seal assembly for providing a seal between an outer shaft and an inner shaft. The assembly includes a seal subassembly disposed between the shafts. The subassembly includes a split carbon ring, a solid outer ring, and a spring mechanism provided between the split carbon ring and the solid outer ring. The carbon ring is radially split into a plurality of segments having splits between ends of adjacent segments. The segments include a circumferential inner radius and a sealing dam on the circumferential inner radius. The solid outer ring includes a sealing face and a plurality of hydrodynamic grooves provided on a radial face. The spring mechanism may be configured to engage a portion of an outer diameter of the split carbon ring and a portion of an inner diameter of the solid outer ring and to urge the split carbon ring radially towards the inner shaft.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
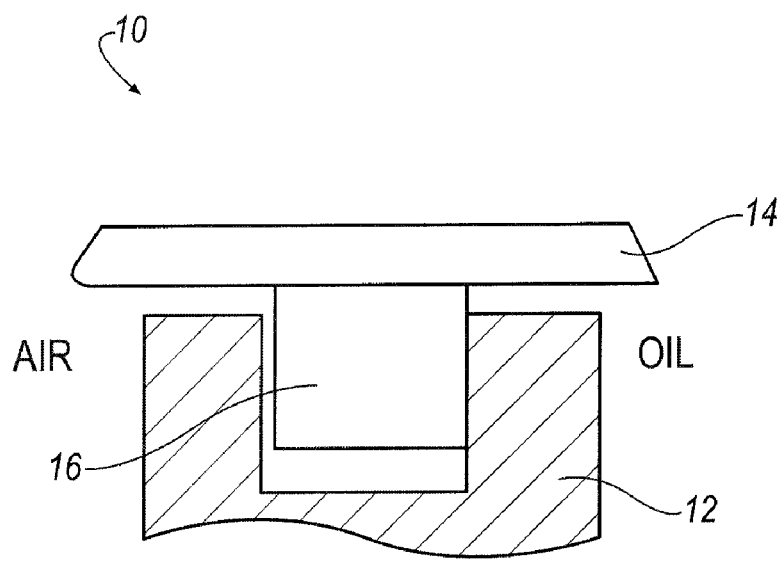
FIG. 1 is a schematic representation of a prior art piston-ring type sealing configuration.
Figure 2:
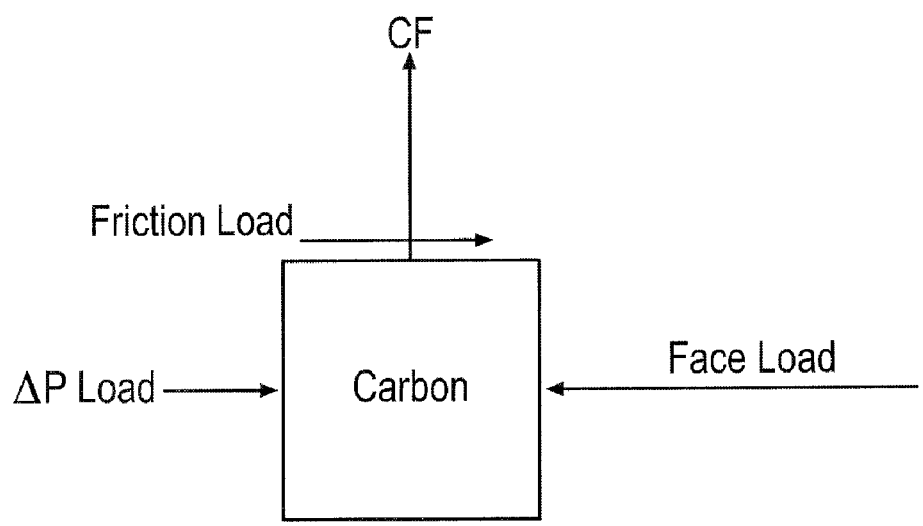
FIG. 2 is a force diagram associated with the configuration illustrated in FIG. 1.

FIG. 1 shows a schematic representation of a prior art seal design involving a piston-ring type configuration. The illustrated assembly 10 consists of an inner shaft shoulder 12, an outer shaft spool 14, and a cracked carbon ring 16 that rotates with the lower speed outer shaft spool 14. FIG. 2 is a force diagram that illustrates the principal forces associated with the configuration represented in FIG. 1. With the configuration, axial shaft translation resulting in carbon ring sliding can cause an additional face loading between the sealing faces. For typical designs of this type, the maximum CF radial load can be about 400 lb-f at maximum speed conditions. The axial load (friction load) required to slide the carbon due to CF with a friction coefficient of 0.1 (normal carbon) can result in an additional reaction load of 40 lb-f on the sealing faces (face load). If some coking is formed in the area, the friction coefficient can increase significantly, and can be enough to accelerate the wear of the carbon and the shoulder coating. Among other things, as discussed in further detail herein, seals and assemblies associated with embodiments of the present invention incorporate hydrodynamic features that can cause the faces to operate in a non-contact mode—which can result in significantly reduced wear and power requirements.

Figure 3:
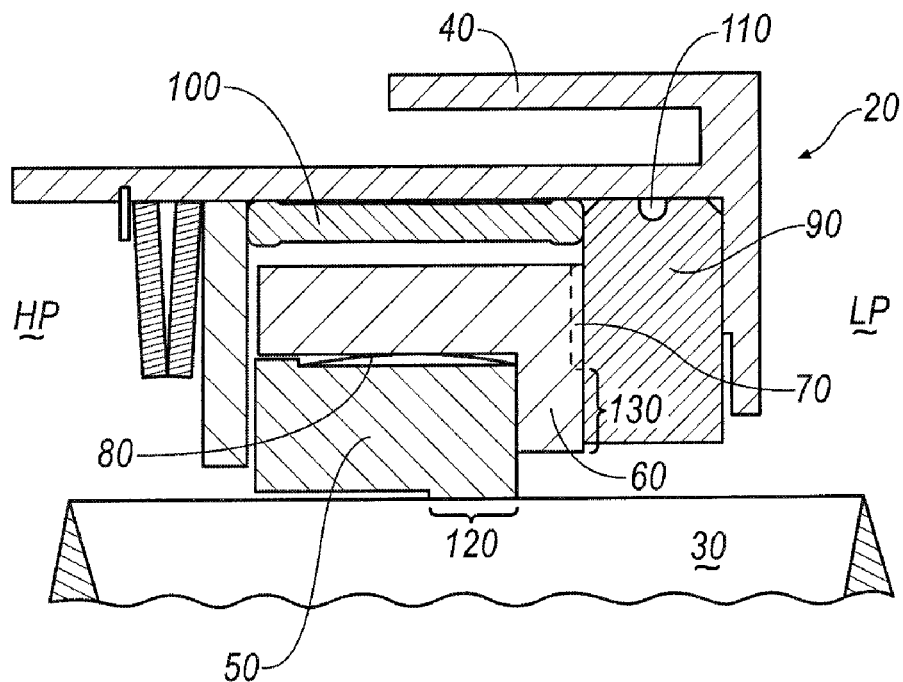
FIG. 3 is a cross-sectional view of a seal assembly according to an embodiment of the invention.

An embodiment of a cross section of an intershaft sealing assembly including aspects of the invention is illustrated in FIG. 3. The illustrated seal assembly 20 includes an inner shaft 30, an outer shaft 40, a split carbon ring 50, a solid outer ring 60 including hydrodynamic grooves 70, a spring mechanism 80, a solid carbon ring 90, a spacer 100, and a centering spring 110. The split carbon ring 50, the solid outer ring 60, and the spring mechanism 80 rotate in the direction of the inner shaft 30. The solid carbon ring 90 rotates in both in the direction and with the speed of the outer shaft 40. In an embodiment, the seal assembly 20 is positioned axially between two seal rings connected or attached to the outer shaft. The axial gap between the two seal rings connected or attached to the outer shaft is at least slightly greater than the axial width of the seal subassembly. For embodiments, the axial width of the seal subassembly is within the range of about 0.005 inches and about 0.062 inches.

Dynamic sealing may be provided across a sealing dam 120 at an inner diameter (I.D.) of the split carbon ring 50 and a face sealing dam 130 on the hydrodynamic face. The split carbon ring 50 can be configured to hug or grab the inner shaft 30 when a closing radial force is applied to the split carbon ring 50—for example, to the outer diameter (O.D.) 132 of the split carbon ring 50. Such a closing [radial] force may be supplied by pressure on the O.D. of the split carbon ring 50, spring mechanism 80, or both. In an embodiment, the carbon ring 50 may be split into a plurality of segments, for example, 4 or 6 segments; however, other desired numbers of segments may be employed. Splitting can be accomplished, for example, by a cracked carbon method or providing a machined face between segments. The split carbon ring 50 may be permitted to move or slide axially along the inner shaft 30 if sufficient axial force is applied to overcome friction between the split carbon ring I.D. sealing dam 120 and associated surface of the inner shaft 30.

A solid outer ring 60 may be provided with hydrodynamic grooves 70 and a face sealing dam 130 on the mating face may be split over the split carbon ring 50. The hydrodynamic grooves may be configured to create a high pressure region in the grooves that separate the hydrodynamic face on the solid outer ring 60 from the mating solid carbon ring 90. The two mating faces run non-contact at some minimum speed. A spring mechanism 80 is provided between the solid outer ring 60 and the split carbon ring 50 to associate or tie the two components together.

Figure 4A:
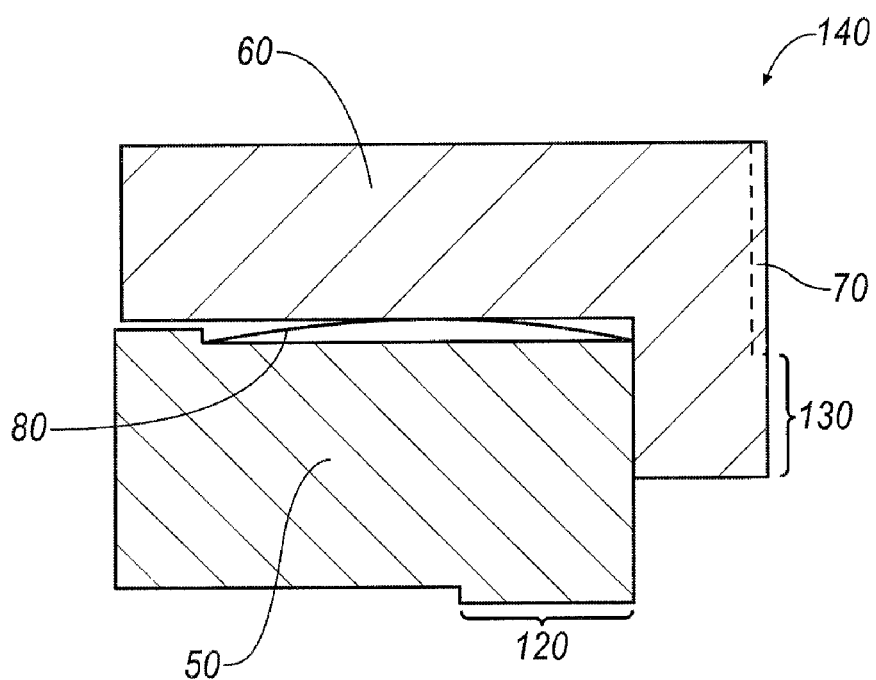
FIG. 4A is an enlarged view of a seal illustrated in connection with FIG. 3.
Figure 4B:
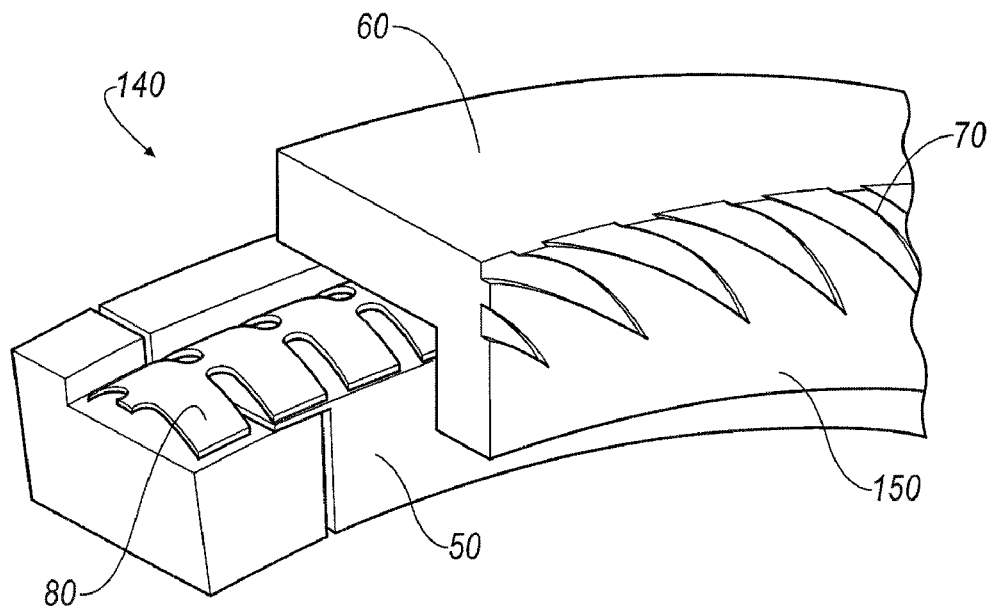
FIG. 4B is partial perspective view of an embodiment of a seal of the type generally illustrated in FIGS. 3 and 4.

FIGS. 4a and 4b generally illustrate a seal ring assembly according to an embodiment of the invention. The illustrated seal ring assembly 140 includes a split carbon ring 50, a spring mechanism 80, and a solid outer ring 60. The seal ring assembly 140 presents a hydrodynamic face 150.

Figure 5:
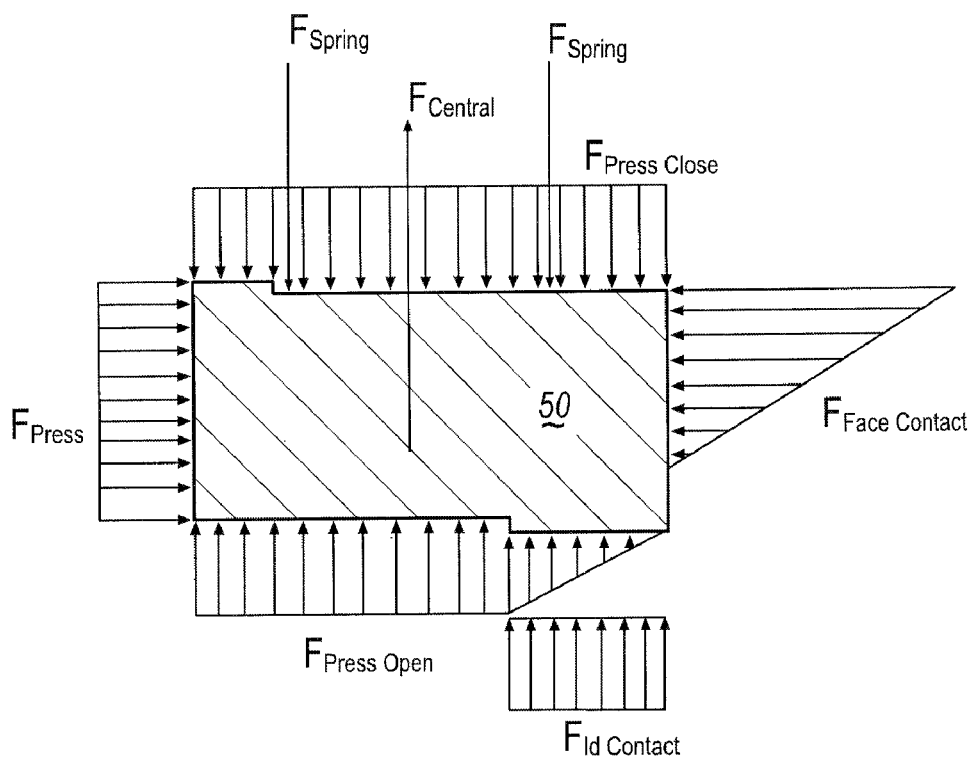
FIG. 5 is a force diagram generally illustrating radial and axial forces associated with an embodiment of a split carbon ring.
Figure 5A:
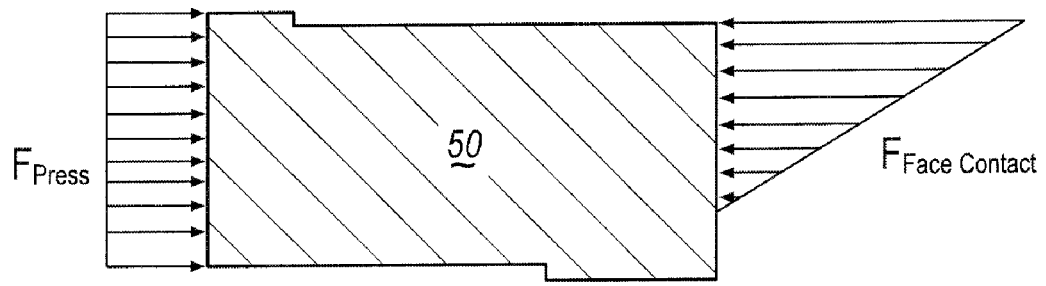
FIG. 5A is a force diagram generally illustrating the axial forces associated with an embodiment of a split carbon ring.
Figure 5B:
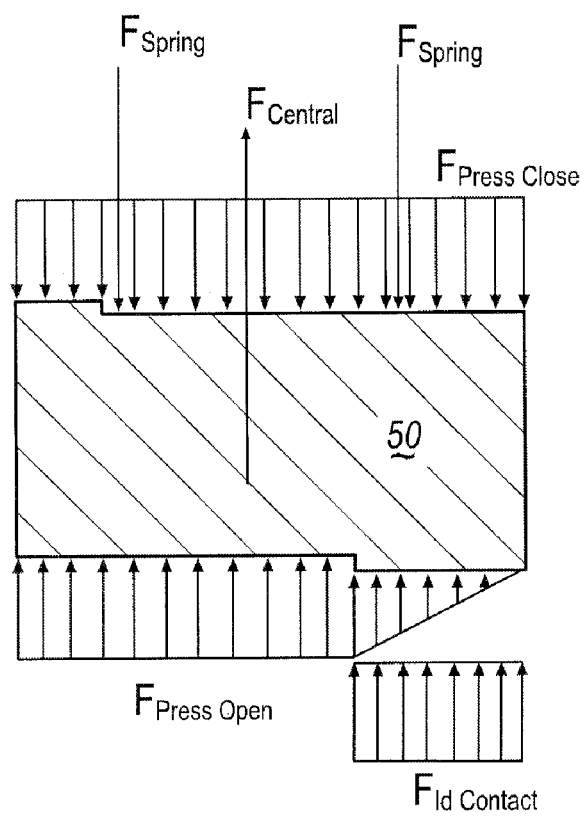
FIG. 5B is a force diagram generally illustrating the radial forces associated with an embodiment of a split carbon ring.

FIG. 5 illustrates a free body diagram of the split carbon ring 50 showing both radial and axial forces. FIG. 5A generally depicts axial forces applied to the split carbon ring 50. As generally illustrated pressure acts on the face to the left of the figure. This axial force is reacted to or countered by a face contact pressure at the solid ring-carbon ring interface, such that $F_{Press}=F_{Face\ Contact}$. The vertical forces acting upon the split carbon ring 50 are generally illustrated in FIG. 5B. As represented, radial closing forces are generally balanced by radial opening forces. The closing forces are comprised of (a) the pressure force acting on the O.D. of the split carbon ring ($F_{Press\ Close}$) and the spring force provided by the finger spring ($F_{Spring}$). The opening forces are comprised of the contact force across the sealing dam ($F_{Id\ Contact}$), the centrifugal force due to rotation ($F_{Centrif}$), and the pressure force acting on the area at the I.D. of the split carbon ring ($F_{Press\ Open}$). Equation (1) below represents a summation of the principal radial forces.

$$F_{Press\ Close} + F_{Spring} = F_{Press\ Open} + F_{Id\ Contact} + F_{Centrif} \quad \text{(Equation 1)}.$$

Considering only the pressure forces, $F_{Press\ Close}$ will always be greater than $F_{Press\ Open}$ because of the greater associated surface area. A net closing force due to pressure will virtually always exist. However, neither the pressure forces nor the spring forces are materially influenced by rotational speed. Consequently, as the speed of the inner shaft 30 is increased, the seal assembly 140 begins to rotate at the speed of and in the same direction as the inner shaft 30, resulting in an increase of the centrifugal force ($F_{Centrif}$). For the foregoing relationship to be balanced, the contact force across the sealing dam ($F_{Id\ Contact}$) must therefore be reduced.

Figure 6:
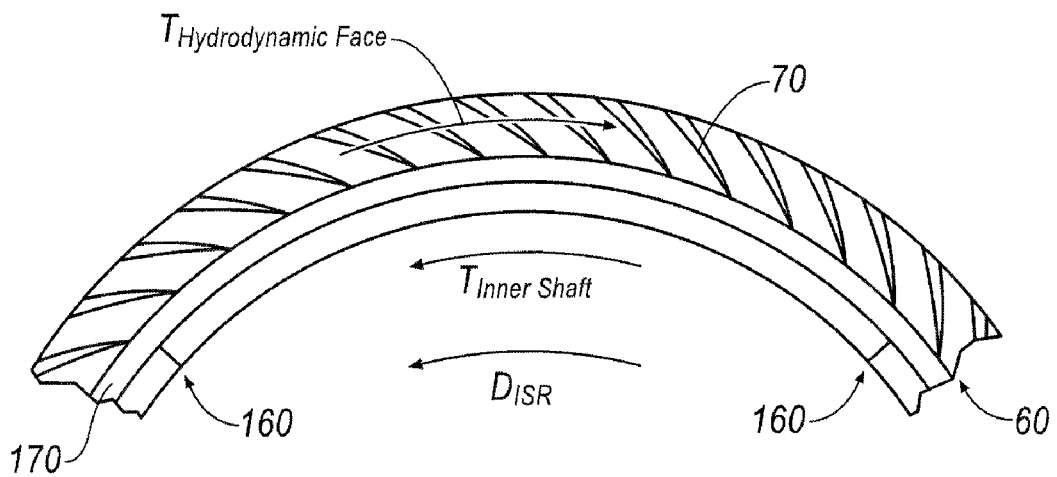
FIG. 6 is representation generally illustrating the torques applied to an embodiment of a rotating assembly.

With reference to FIG. 6, the torque defined as $T_{InnerShaft}$ is related to $F_{Id\ Contact}$ by the following relationship:

$$T_{InnerShaft} = (F_{Id\ Contact})\, r_i\, \mu \quad \text{(Equation 2)}.$$

Rearranging the equation yields the following:

$$F_{Id\ Contact} = (T_{InnerShaft})/r_i\, \mu \quad \text{(Equation 3)}.$$

The force balance relationship of Equation 1 can therefore be expressed as follows:

$$F_{Press\ Close} + F_{Spring} = F_{Press\ Open} + [T_{InnerShaft})/r_i\, \mu] + F_{Centrif} \quad \text{(Equation 4)}.$$

$T_{InnerShaft}$ is the torque applied at the I.D. of the split carbon ring 50 by the inner shaft 30 and acting in the direction of the inner shaft rotation. The centrifugal force on a carbon segment may be represented as follows:

$$F_{Centrif} = F_{Centrif} = (\omega^2\, \rho D/g) \int_0^{\theta_1} d\theta \int_{r_i}^{r_o} r^2\, dr \quad \text{(Equation 5)}.$$

For a ring of rectangular cross section, the net resultant centrifugal force on a carbon segment can be calculated using Equation 6 below:

$$F_{Centrif} = F_{Centrif} = \sqrt{\left(\frac{\omega^2 \rho D}{3g}(r_0^3 - r_i^3)\sin\theta_1\right)^2 + \left(\frac{\omega^2 \rho D}{3g}(r_0^3 - r_i^3)(1-\cos\theta_1)\right)^2} \quad \text{(Equation 6)}$$

In the foregoing equations, $F_{Id\ Contact}$ is the force due to contact between the I.D. of the split carbon ring and shaft surface; $\mu$ is the coefficient of friction between the carbon I.D. and shaft surface at the dam region; $\omega$ is the rotational speed of the rotating ring assembly; $\theta_1$ is the angle of the carbon segment (radians); $r_i$ is the inner radius of the carbon ring segment; $r_o$ is the outer radius of the carbon ring segment; $\rho$ is the density of the carbon; D is the axial depth of the carbon ring segment; and g is the acceleration of gravity.

Consequently, as $F_{Id\ Contact}$ decreases, $T_{InnerShaft}$ must also decrease.

The torques applied to the rotating assembly (for example, as shown in FIG. 4) are generally represented in FIG. 6. The illustrated partial segment shown in FIG. 6 includes a reference to several split carbon ring interfaces 160 and a dam section 170. For reference, the direction of inner shaft rotation is labeled $D_{ISR}$.

With continued reference to FIG. 6, the sliding interface at the hydrodynamic face (e.g., face 150 illustrated in FIG. 4B) generates a torque ($T_{HydrodynamicFace}$) on the rotating assembly and acts in the same direction as the rotation of the outer shaft 40. Before liftoff occurs, $T_{HydrodynamicFace}=F_{Pressure}\,\mu$, where $F_{Pressure}$ is the pressure loading on the rotating assembly, and $\mu$ is the coefficient of friction between the solid carbon ring 90 and the face of the solid outer ring 60. When liftoff between the solid outer ring 60 and the solid carbon ring 90 occurs, $T_{HydrodynamicFace}$ is generated substantially entirely by the shearing of the gas between the faces and increases with speed. However, as previously noted, the torque $T_{InnerShaft}$ decreases with increased speed. At some speed, a balance point is reached where $T_{HydrodynamicFace}$ equals $T_{InnerShaft}$. To maintain such a torque balance relationship, further speed increase of the seal ring assembly 140 will be halted. That is, the seal assembly rotational speed will stabilize and rotate at the "balance" speed to maintain the foregoing relationship. Rotational slippage will occur at the dam section of the split carbon ring 50 and inner shaft 30. Light or nominal contact at the dam path will remain relatively low. The desired rotational speed range of the rotating assembly can be controlled by considering the inertial loading on the split carbon ring 50 along with the spring mechanism 80 load.

Figure 7:
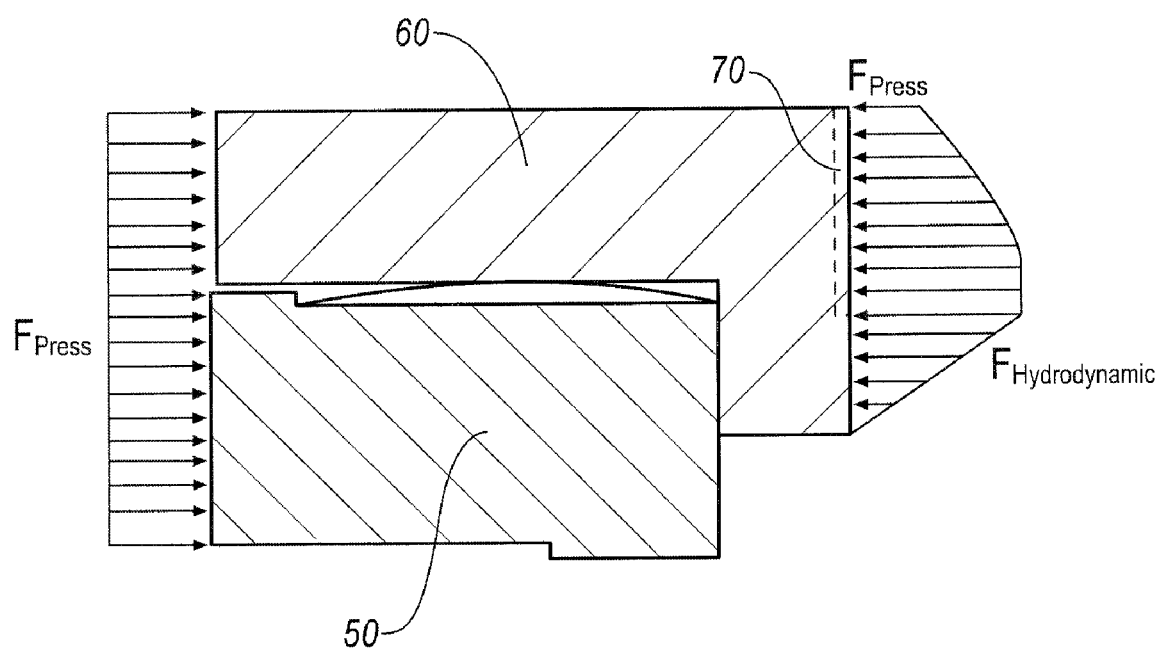
FIG. 7 is a force diagram generally illustrating the axial forces applied to a rotating assembly according to an embodiment of the invention.

A free body diagram generally illustrating the axial forces on the rotating assembly is generally presented in FIG. 7. Pressure force on the left face pushes the rotating assembly into the solid carbon ring 90 where a hydrodynamic force is developed between the mating faces (right side of FIG. 7). The force balance equation becomes:

$$F_{Press} = F_{Hydrodynamic} \qquad \text{(Equation 7).}$$

With continuing reference to FIG. 7, the illustrated hydrodynamic force ($F_{Hydrodynamic}$) is generated by grooves provided on the face of the solid outer ring 60. The pressure buildup in the hydrodynamic groove 70 is a function of groove design and configuration, the relative speed between mating faces, fluid density, and the clearance between the mating faces. Decreasing the operating clearance between the faces increases the hydrodynamic opening force and, conversely, increasing the clearance decreases the associated opening force. The clearance between the mating surfaces will generally self-adjust to maintain an axial force balance on the rotating assembly. In an embodiment, the "optimum" clearance is less than 0.0005 inches. Because the seal operates at very slight clearance, the associated wear, heat generation, power, and leakage can be very low.

Figure 8:
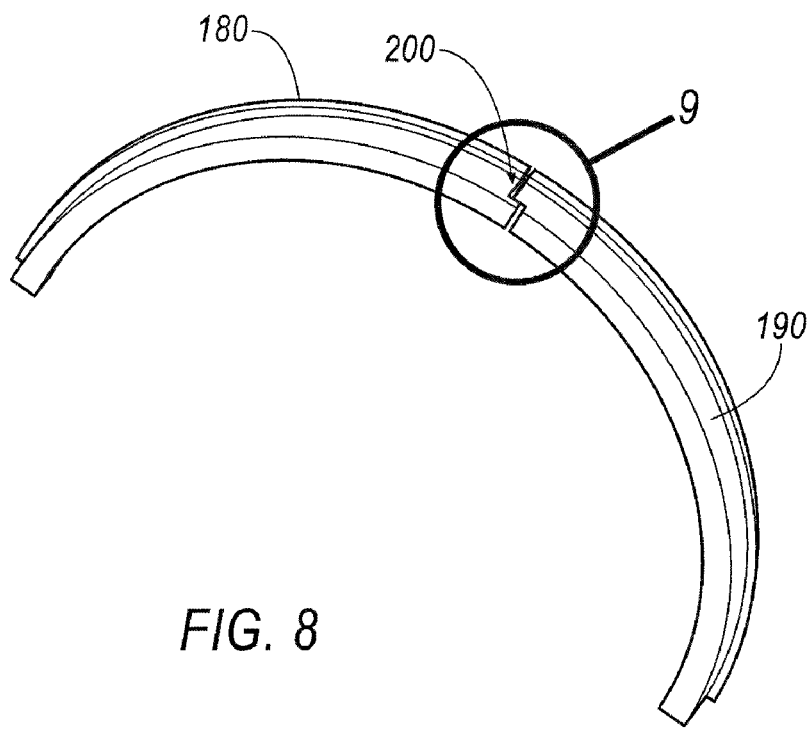
FIG. 8 is perspective representation of two adjacent carbon ring segments.
Figure 9:
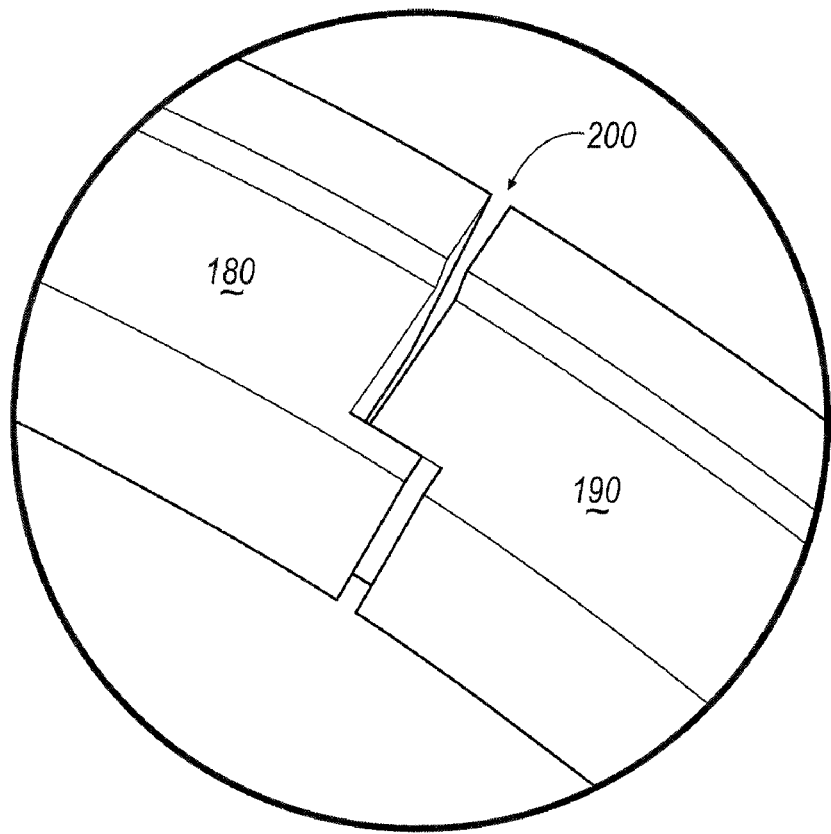
FIG. 9 is an enlarged representation of the segment portions identified in FIG. 8.

Referring to FIG. 8, two segments of a carbon ring are shown—segments 180 and 190. A split 200 is shown between the segments 180,190. FIG. 9 illustrates an enlarged close-up view of the segment portions identified in FIG. 8. In embodiments of the invention, segments 180 and 190 may include respective ends at or about the associated split 200 there between so as to provide an overlapping configuration. An overlapping configuration can, among other things, provide for reduced leakage through the gap provided by the split 200 between the segments 180,190. Such a configuration will still permit air leakage over the top and radially down the smaller gap.

Without limitation, such splits 200 may be manufactured or provided using the "cracked carbon" method and/or the splits may be machined. The splits 200 present a potential additional leak path especially when the design of the seal is such that the gap provided by the split can increase or decrease over the operational range of the seal.

Figure 10:
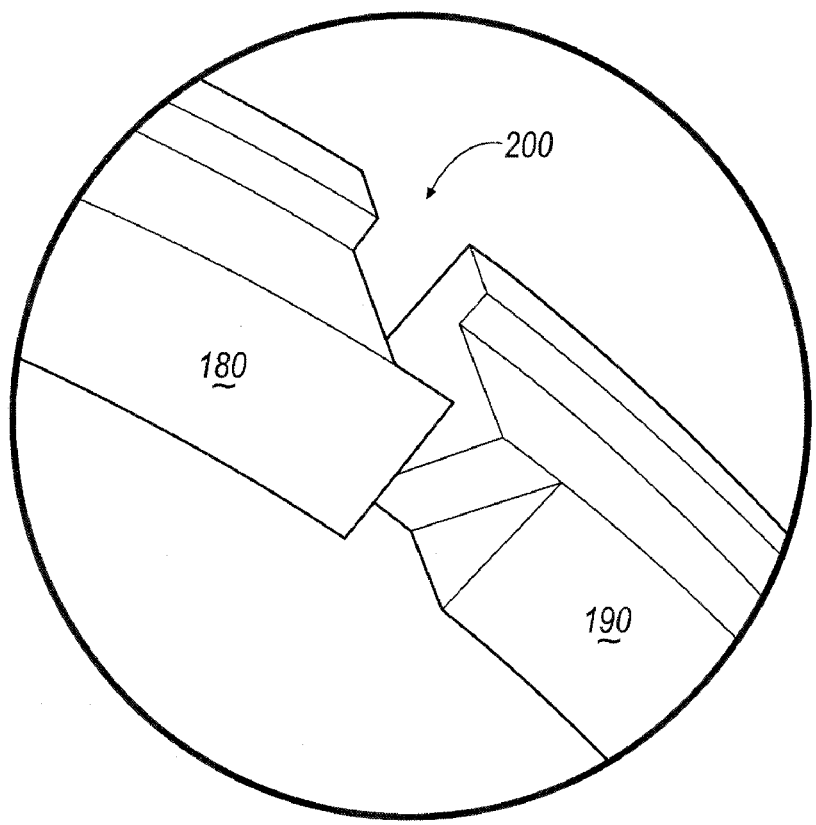
FIGS. 10 and 11 illustrate opposing perspective views of ends of adjacent carbon ring segments that generally provide an overlapping annular configuration according to an embodiment of the invention.
Figure 11:
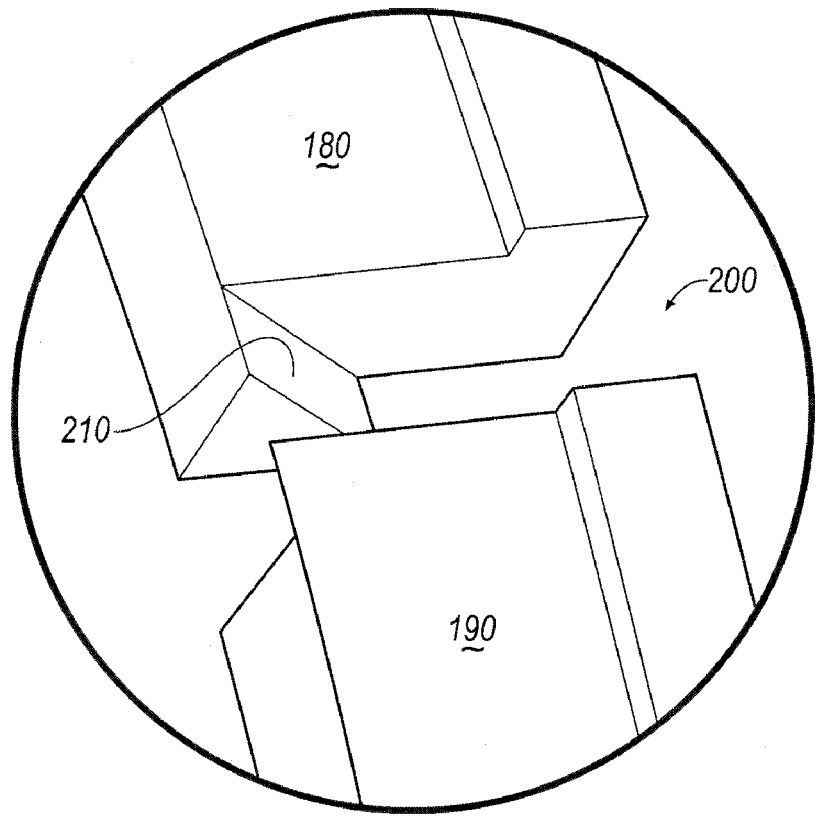

FIGS. 10 and 11 generally illustrate two views of another design configuration that may be included with the mating segments 180, 190. In the illustrated embodiment, angular portions 210 provide for an angular overlap joint. Such an angular overlap joint configuration can further reduce associated joint leakage associated with the seal. For a number of applications, it is desirable to prevent the split carbon ring 50 from becoming arch-bound over the functional life of the seal. At the same time, it is generally desirable for the split carbon ring 50 to reliably grab or hug the associated inner shaft 30. Over time, wear can occur, which can increase the I.D. of the split carbon ring 50. To better ensure that the associated carbon segments (e.g., 180 and 190) do not become arch-bound, adequate clearance may be "built-in" between the associated segments. It has been found that employing an overlapping annular design configuration (e.g., as shown in FIGS. 10 and 11) can help ensure that a leakage "penalty" will not be incurred.

Referring again to FIG. 3, spring mechanism 80 is configured to fit between the outer diameter of the carbon split ring 50 and the inner diameter of the solid outer ring 60. In an embodiment, spring mechanism 80 is configured to exert a substantially constant radial inward force on the split carbon ring 50. Moreover, for some embodiments, the spring mechanism 80 provides a minimum spring force of at least ½ lb/linear inch.

Figure 12:
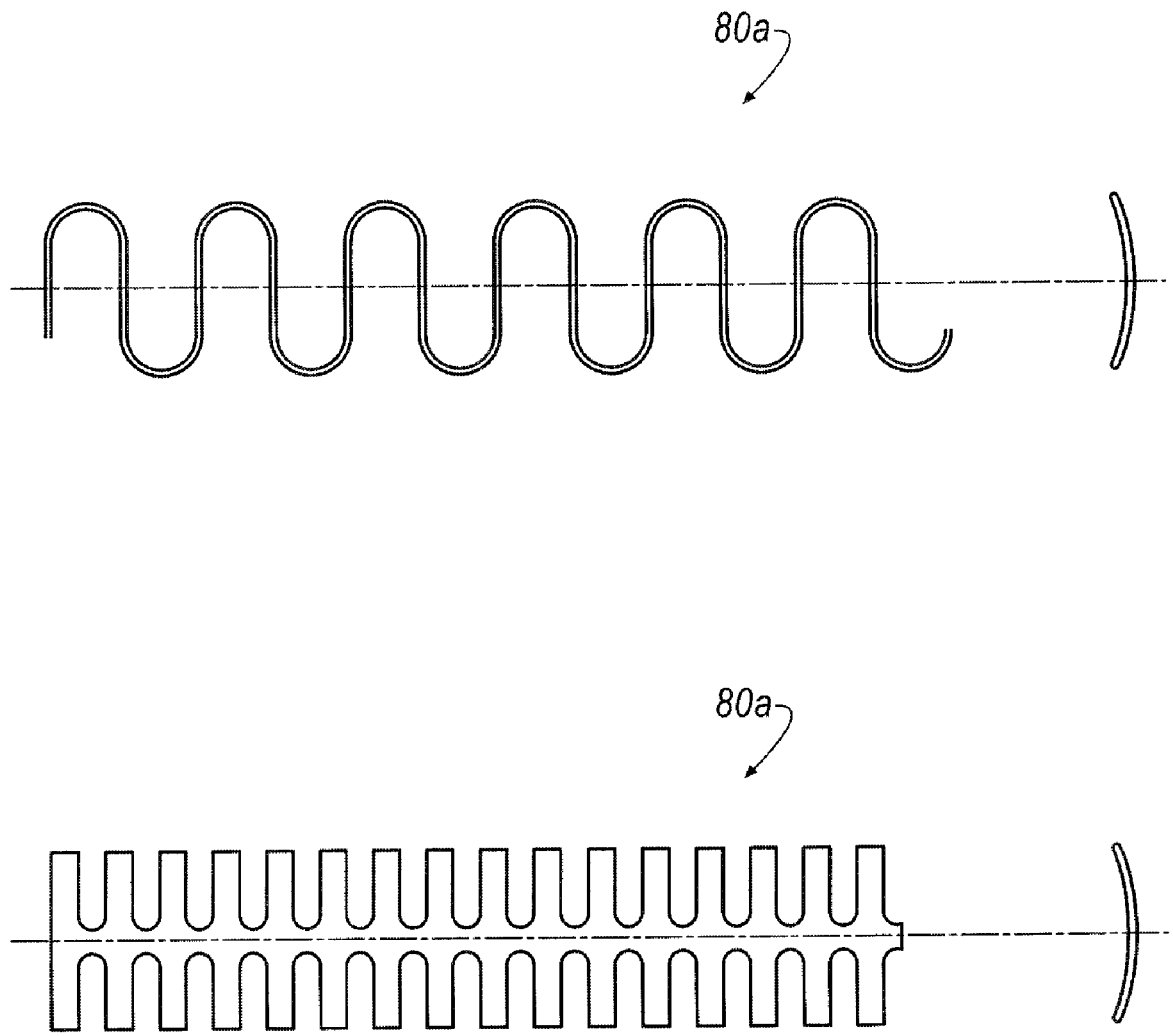
FIG. 12 illustrates top plan and corresponding side views of embodiments of a spring mechanism.

Without limitation, FIG. 12 generally illustrates two different embodiments of spring mechanism configurations identified as 80a and 80b. Spring mechanism 80a generally represents an embodiment of a spring mechanism in the form of a wound wire type (e.g., "S"-type) finger spring. By way of further example, without limitation, the spring mechanism may also take the form of a "kerfed" type finger spring, such as generally illustrated as 80b. For embodiments, the kerfed type design may, for instance, be manufactured from sheet stock. The spring stiffness associated with the spring mechanism 80 may, for example, be controlled by the wire diameter or the sheet stock thickness, along with the design of the various structures and/or features. End views of each form of exemplary spring mechanisms are shown as 80a' and 80b', respectively. Both of the illustrated designs are rounded or circular in shape. In embodiments of the invention, an associated spring force is generated by compression of the rounded or circular shape. Moreover, the force that is generated is determined by the amount of spring mechanism compression.

Figure 13:
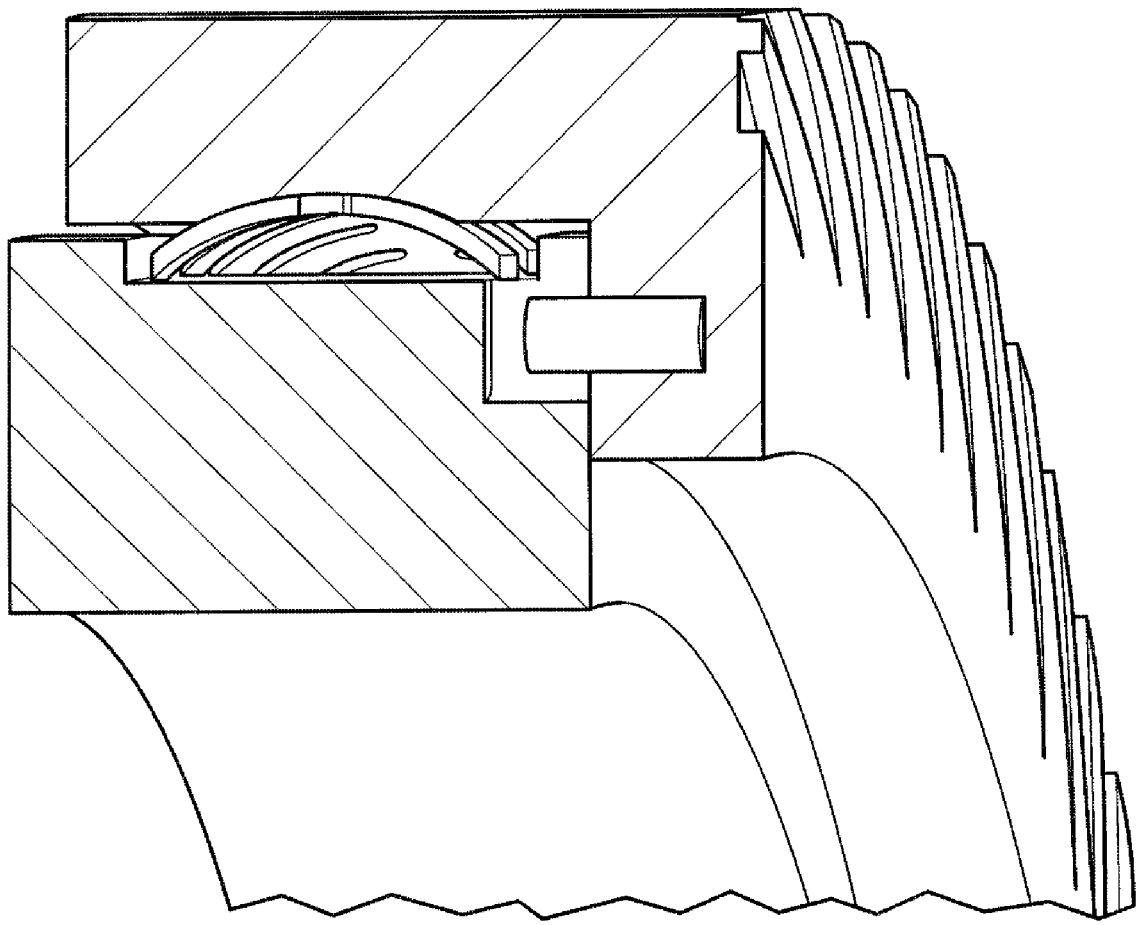
FIG. 13 is a partial cross-sectional perspective view of assembled seal elements according to an embodiment of the invention.

In an embodiment, an anti-rotation feature may be provided to prevent the carbon split ring segments (e.g., 180 and 190) from moving circumferentially with respect to one another. Each carbon split ring segment may include an anti-rotation feature to keep ends of adjacent segments separate. FIG. 13 generally illustrates an embodiment of an anti-rotation feature in the form of pin 220. In the illustrated embodiment, pin 220 may be pressed into the solid outer ring 60 and engage a slot provided in the split carbon ring 50. For a number of embodiments, the anti-rotation feature may be provided at a central location with respect to the carbon split ring segment.

FIG. 13 additionally illustrates another potentially beneficial optional feature. That is, such as generally illustrated, a portion of the spring mechanism 80 may lock into a portion of the solid outer ring 60. By substantially matching the curvature of an inner diameter portion the solid outer ring 60 to the curvature of at least a portion of the spring mechanism 80, assembly of the spring mechanism 80 and the split carbon ring segment 50 into the solid outer ring 60 will substantially "lock" the components together. Such "locking" can allow the components to remain connected together in the event of a reverse pressure.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A seal assembly for providing a seal between an outer shaft and an inner shaft, the seal assembly comprising:
    an inner rotary shaft;
    an outer rotary shaft; and
    a seal subassembly disposed between the inner shaft and the outer shaft, the seal subassembly including:
        a split carbon ring radially split into a plurality of segments and having a plurality of splits between ends of adjacent segments, the segments including a circumferential inner radius and a sealing dam on the circumferential inner radius;

a solid outer ring including a sealing face facing the split carbon ring and a plurality of hydrodynamic grooves provided on a radial face opposite of the sealing face; and a radial spring mechanism provided between a portion of the split carbon ring and a portion of the solid outer ring;

wherein the spring mechanism is configured to engage a portion of an outer diameter of the split carbon ring and a portion of an inner diameter of the solid outer ring; and the spring mechanism is configured to urge the split carbon ring radially towards the inner shaft.

2. The seal assembly of claim 1, wherein the spring mechanism is sized or configured to permit the seal subassembly to rotate at an intermediate speed relative to the rotational speed of the inner shaft and the rotational speed of the outer shaft.

3. The seal assembly of claim 1, wherein the inner shaft and the outer shaft are configured to rotate in opposing directions.

4. The seal assembly of claim 1, wherein the seal subassembly is configured to rotate in the direction of the inner shaft.

5. The seal assembly of claim 1, wherein the split carbon ring is circular.

6. The seal assembly of claim 1, wherein the outer shaft is hollow.

7. The seal assembly of claim 1, wherein the outer shaft is configured to be driven by at a first speed and the inner shaft is configured to be driven at a comparatively higher speed than the first speed.

8. The seal assembly of claim 1, wherein the subassembly is positioned axially between two seal rings connected or attached to the outer shaft.

9. The seal assembly of claim 8, wherein the axial gap between the two seal rings connected or attached to the outer shaft is at least slightly greater than the axial width of the seal subassembly.

10. The seal assembly of claim 9, wherein the axial width of the seal subassembly is within a range of about 0.005 to about 0.062.

11. The seal assembly of claim 1, wherein the ends of adjacent segments are configured to provide overlapping portions.

12. The seal assembly of claim 11, wherein the ends of adjacent segments include an angular portion.

13. The seal assembly of claim 1, wherein the solid outer ring is comprised of a metal.

14. The seal assembly of claim 1, wherein the solid outer ring is comprised of a ceramic material.

15. The seal assembly of claim 1, including a seal ring attached to the outer rotor and configured to interface with the radial face of the solid outer ring.

16. The seal assembly of claim 15, wherein the seal ring is comprised of a softer material than the solid outer ring.

17. The seal assembly of claim 15, wherein the seal ring is comprised of carbon.

18. The seal assembly of claim 1, wherein the spring mechanism provides a spring force of at least ½ lb/linear inch.

19. The seal assembly of claim 1, wherein the spring mechanism comprises a spring.

20. The seal assembly of claim 19, wherein the spring mechanism comprises a wire-type spring.

21. The seal assembly of claim 19, wherein the spring mechanism comprises a kerfed-type finger spring.

22. The seal assembly of claim 1, including an anti-rotation feature configured to prevent the split carbon ring segments from moving circumferentially with respect to one another.

23. The seal assembly of claim 1, wherein the hydrodynamic grooves are configured to create a high pressure region in the grooves that separates a hydrodynamic face on the solid outer ring from a mating solid ring.

24. The seal assembly of claim 1, including a spacer provided radially between the outer shaft and the solid outer ring.

* * * * *